US007403503B2

(12) United States Patent
Cuffaro et al.

(10) Patent No.: US 7,403,503 B2
(45) Date of Patent: Jul. 22, 2008

(54) RESOURCE ALLOCATION IN WIRELESS COMMUNICATION SYSTEMS

(75) Inventors: Angelo Cuffaro, Laval (CA); Paul Marinier, Brossard (CA); Christopher Cave, Candiac (CA)

(73) Assignee: InterDigital Technology Corporation, Wilmington, DE (US)

( * ) Notice: Subject to any disclaimer, the term of this patent is extended or adjusted under 35 U.S.C. 154(b) by 824 days.

(21) Appl. No.: 10/750,206

(22) Filed: Dec. 31, 2003

(65) Prior Publication Data
US 2005/0009532 A1    Jan. 13, 2005

Related U.S. Application Data

(60) Provisional application No. 60/485,800, filed on Jul. 9, 2003.

(51) Int. Cl.
*H04Q 7/00* (2006.01)
(52) U.S. Cl. .................................................... 370/329
(58) Field of Classification Search .................. None
See application file for complete search history.

(56) References Cited

U.S. PATENT DOCUMENTS

| | | | |
|---|---|---|---|
| 5,491,837 A | 2/1996 | Haartsen | |
| 6,088,335 A * | 7/2000 | I et al. ........................ | 370/252 |
| 6,226,520 B1 | 5/2001 | Jeoung | |
| 6,320,854 B1 | 11/2001 | Farber et al. | |
| 6,434,128 B1 | 8/2002 | Benz et al. | |
| 6,535,503 B1 | 3/2003 | Toskala et al. | |
| 6,850,500 B2 * | 2/2005 | Zeira et al. ................... | 370/328 |
| 2003/0031147 A1 | 2/2003 | Zeira et al. | |
| 2004/0242161 A1 | 12/2004 | Marinier | |

FOREIGN PATENT DOCUMENTS

| | | |
|---|---|---|
| KR | 1994-12914 | 6/1994 |
| KR | 1998-68872 | 10/1998 |
| WO | 98/27763 | 6/1998 |

OTHER PUBLICATIONS

Rave et al, Evaluation of Load Control Strategies in an UTRA/FDD Network, IEEE, pp. 2710-2714, 2001.*

Morimoto et al. "Cell Selection Based on Shadowing Variation for Forward Link Broadband OFCDM Packet Wireless Access." 56th IEEE Vehicular Technology Conference Proceedings, Sep. 24-28, 2002, pp. 2071-2075.

* cited by examiner

*Primary Examiner*—Frank Duong
(74) *Attorney, Agent, or Firm*—Volpe and Koenig, P.C.

(57) ABSTRACT

A method and system wherein the coverage area of a plurality of base stations may be evaluated with respect to noise rise and power for assignment of system resources is disclosed. Path loss is measured to determine candidate base stations and at least one timeslot is selected from within the candidate base stations for optimization of the uplink and downlink.

14 Claims, 3 Drawing Sheets

RESOURCE ALLOCATION IN WIRELESS COMMUNICATION SYSTEMS

CROSS REFERENCE TO RELATED APPLICATION(S)

This application claims priority from U.S. provisional application No. 60/485,800 filed Jul. 9, 2003 which is incorporated by reference as if fully set forth.

FIELD OF INVENTION

The present invention relates to wireless communication systems. More particularly, the present invention relates to allocating resources to minimize interference in wireless communication systems.

BACKGROUND

Wireless communication systems may be deployed in a number of ways. For example, cellular type systems are typically deployed using an omni deployment or a sectored deployment. In FIG. 1, an omni deployment 10 is shown. Omni deployments are made up of sites with a base station in each site wherein the base stations use transmission (reception) antenna(s) that radiate (receive) nearly uniformly in all directions in the horizontal plane. Omni deployments are typically used for rural, micro-cellular, and indoor areas.

To increase system capacity in densely populated areas, for example, a sectored deployment may be used. An example of a sectored deployment 50 is shown in FIG. 2. Sectored deployments are also made up of sites (i.e. site 1 and site 2) wherein each site includes a base station. In sectored deployments, however, each site is broken down into a plurality of sectors. To provide coverage to each sector, the base stations include a transceiver and antenna(s) for each of their respective sectors so that the antenna(s) in each sector radiate/receive within a different arc. For example, base station 52 has transceivers 56a, 58a, 60a which each radiate with an arc of 120 degrees for sectors 56b, 58b, 60b. For simplicity, the area covered by a transceiver is hereafter referred to as a cell with the understanding that a cell may correspond to either a sector in a sectorized deployment or an area covered by a site in an omnidirectional deployment.

Referring now to FIG. 3, and continuing with cellular type systems purely by way of example, cellular systems generally divide the time axis into continuing intervals of equal duration called frames. A frame 100 is divided into a finite number (Nt) of intervals of equal duration called timeslots. A particular cell is allowed to use some or all of the timeslots for uplink or downlink transmissions as defined by the cell's timeslot assignment. Within each timeslot, it is possible to assign a finite number of codes (Nc) to different WTRU(s) for transmission/reception of wireless signals using spread spectrum technology. The combination of a code and a timeslot is considered a channel and the allocation of the codes to a set of WTRU(s) is referred to as channel allocation. An optimum allocation will reduce interference and increase capacity of the system.

Typically, when a WTRU requests resources (i.e. a set of channels) from a wireless system the WTRU first chooses the base station from which the WTRU has measured the least amount of path loss. Generally, to measure path loss the WTRU subtracts the measured power at which the beacon signals are received from the known transmission power of those signals. The transmission power of the beacon signals is normally signaled within the beacon as part of the system information. The base station from which the least amount of path loss is measured is referred to as the base station that is closest to the WTRU. Note, however, that this base station may not always be the closest in the geographical sense. Once the closest base station has been selected, resources are then allocated to the WTRU. Typically, the channel that is allocated is within a timeslot where the WTRU will experience the least amount of interference.

Interference may originate from two sources, intra-cell and inter-cell. Intra-cell interference is interference seen by a WTRU due to other WTRUs in the same cell as the WTRU. Inter-cell interference is interference seen by the WTRU from WTRUs in other cells. Some wireless communication systems employ some type of multi-user detection (MUD) that cancels most of the intra-cell interference seen by the WTRU. The TDD modes (3.84 Mcps and 1.28 Mcps) of UTRA are examples of such systems. In these systems, channel allocation is primarily concerned with minimizing the inter-cell interference seen by the WTRU.

With respect to inter-cell interference, neighboring cells are typically timeslot synchronized so that the neighboring cells are using the same timeslots for uplink and downlink transmissions. Assigning resources to a WTRU in one cell may result in a significant increase in inter-cell interference to the neighboring cells. For example, the WTRU may be assigned to a timeslot that, although being the timeslot with the least amount of interference, the addition of the WTRU causes a sudden increase in interference that cannot be compensated by WTRUs operating in the same timeslot in neighboring cells (i.e. WTRUs assigned resources from that timeslot cannot transmit with enough power to maintain a satisfactory signal to interference plus noise ratio (SINR)). The above outage can occur due to the well-known power balancing effect between the WTRU and WTRUs from neighboring cells that are also assigned resources in the same timeslot.

Power balancing is a phenomenon that occurs in various wireless communication systems such as CDMA type systems, for example. In CDMA type systems, since all WTRUs within the system share the frequency spectrum, each WTRU sees the other WTRUs noise/interference. To achieve reliable communication, a SINR ratio must be above a certain ratio. When a new WTRU is added to a system, the interference in the system increases. This causes existing WTRUs within the system to increase their power to maintain the SINR above the certain ratio. The power increase from the existing WTRUs causes an increase in interference to the new WTRU. The new WTRU then increases its power again to maintain the SINR. This pattern continues until the SINR stabilizes. In cases where the SINR does not stabilize, one or more WTRU's will experience outage. In the prior art, there is a mechanism to predict the increase in interference, based on the current level of interference and relative path loss of the new WTRU to the system. This mechanism can be used to choose the timeslot with the lowest predicted increase in interference. However, there may be cases where, although resources within the timeslot in this cell and neighboring cells are not fully used (i.e. the MUD benefits are not fully realized), there is no suitable timeslot within this cell for the new WTRU in this cell. This will lead to a blocked WTRU admission.

It would therefore be desirable to have a method and system for assigning resources in wireless communication systems without such limitations.

SUMMARY

The present invention is a method and system wherein the coverage area of a plurality of base stations may be evaluated with respect to noise rise and power for assignment of system resources. Path loss is measured to determine candidate base stations and at least one timeslot is selected from within the candidate base stations for optimization of the uplink and downlink.

BRIEF DESCRIPTION OF THE DRAWING(S)

DETAILED DESCRIPTION OF THE PREFERRED EMBODIMENT(S)

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment. Further, for convenience in describing the invention the terms cell and base station may be used interchangeably herein.

Figure 1:
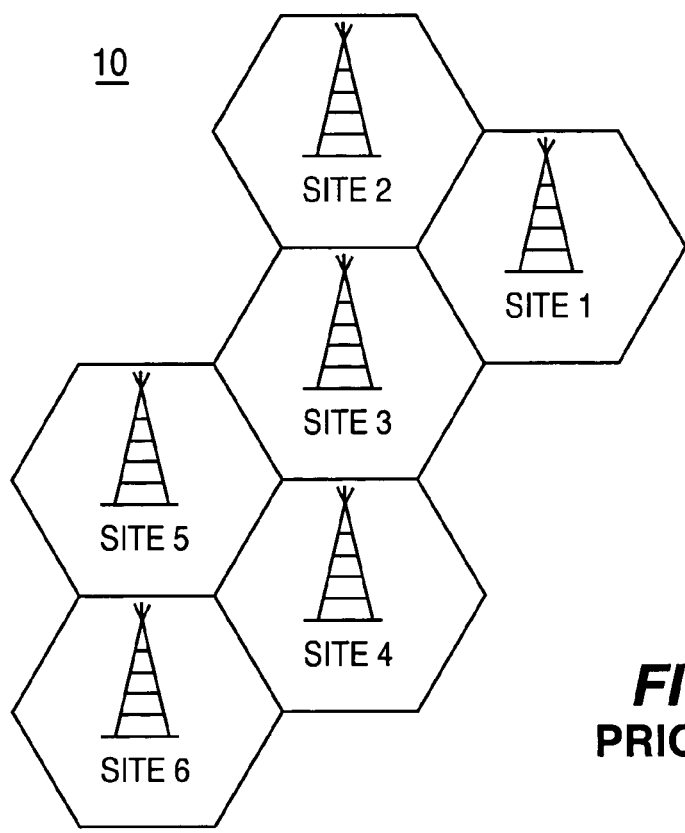
FIG. 1 is a diagram of an omni deployment of a wireless communication system.
Figure 2:
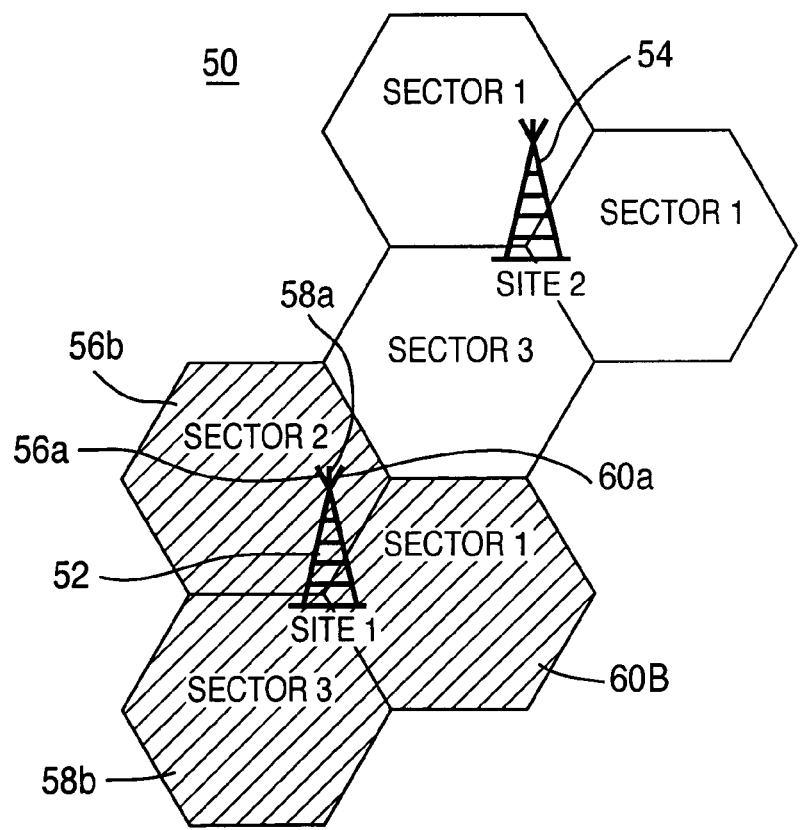
FIG. 2 is a diagram of a sectored deployment of a wireless communication system.
Figure 3:
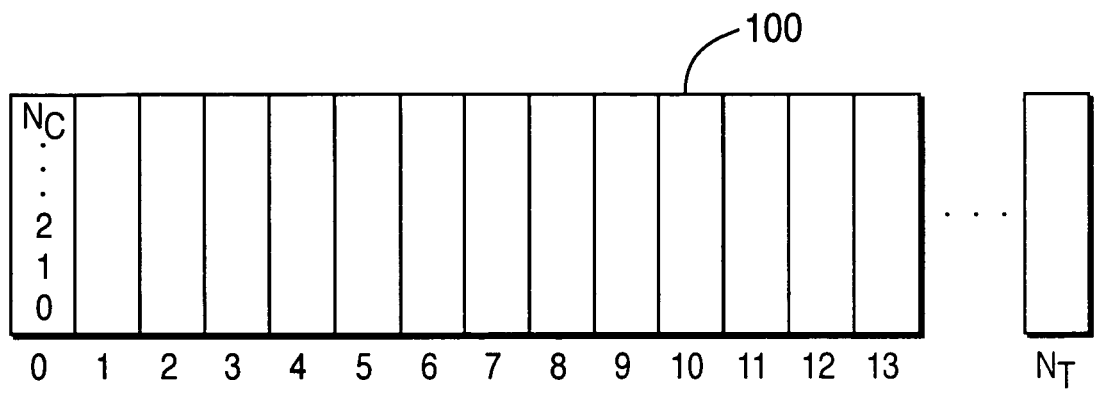
FIG. 3 is a frame having a plurality of timeslots wherein each timeslot has a plurality of channels.
Figure 4:
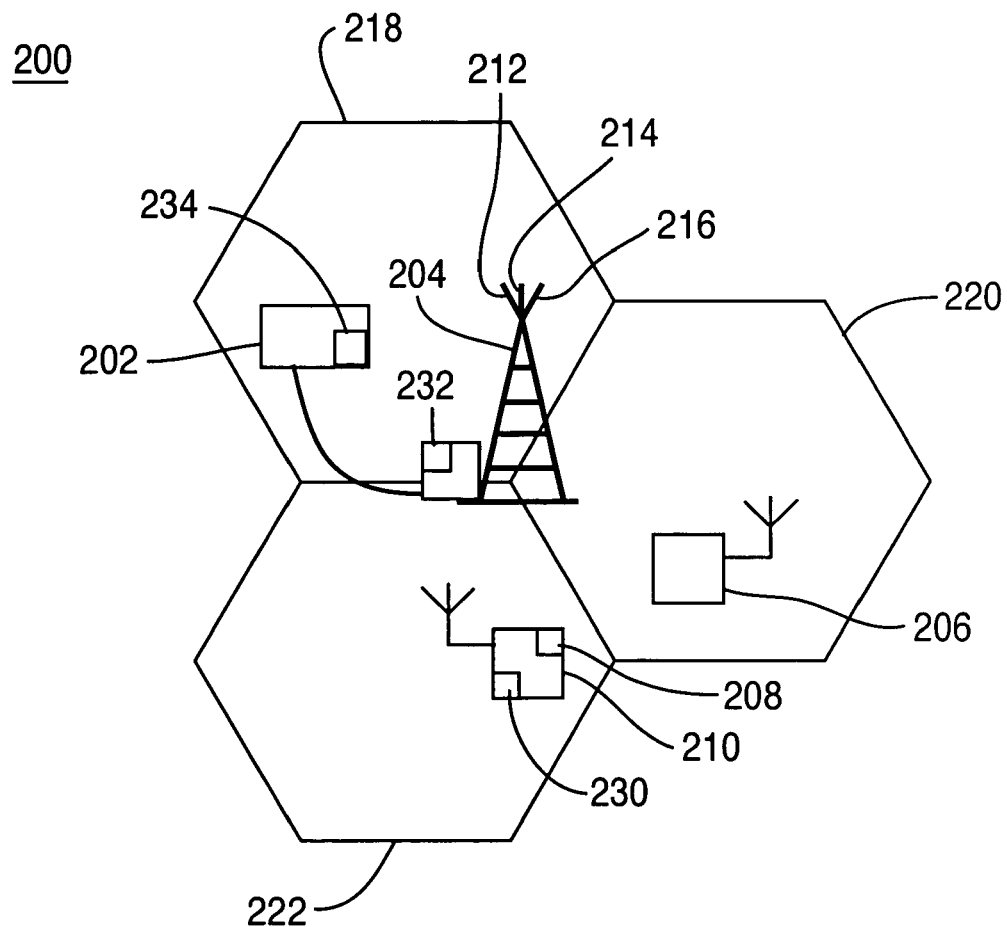
FIG. 4 is a wireless communication system wherein noise rise and power may be evaluated with respect to more than one cell in order to optimize system resources.

Referring now to FIG. 4, there is shown a wireless communication system 200 wherein noise rise and power may be evaluated with respect to the coverage area of more than one base station in order to optimize system resources. For convenience, the coverage area will be referred to as the cell, but of course reference to coverage area will vary according to the type of system the invention is being implemented in or the type of interfacing device being used.

The system 200 includes at least one radio network controller 202, at least one base station 204, and a plurality of WTRUs 206, 210. The system 200 is shown as being deployed in a sectored deployment. The base station 204 therefore includes transceivers 212, 214, 216 corresponding respectively to cells 218, 220, 222. The deployment of course may vary according to operator preference. The deployment and system 200 components may also vary according to the particular type of wireless system in which the present invention is being implemented as the invention may be implemented in any type of wireless system that uses some type of joint detection such as, for example, multi-user detection (MUD) for handling intra-cell interference.

Assume a first WTRU 206 is operating in cell 220 and a second WTRU 210 is requesting system resources as a result of, for example, handover or initial association with the system 200. WTRU 210 will measure the path loss between itself and several cells. As is known in the art, WTRU 210 includes a processor 208 for measuring path loss. In this example, assume WTRU 210 measures the path loss between itself and cells 218, 220, 222. The cells that have a path loss within a predetermined margin of the cell with the minimum path loss as well as the cell with the minimum path loss are considered candidate cells in that they are cells from which a WTRU may request resources. This effectively increases the available timeslots that may be evaluated for assignment of WTRUs. That is, in the prior art, the number of timeslots that may be evaluated are the timeslots of the cell with the minimum path loss. According to the teachings of the present invention, because additional cells may be considered (i.e. the cells having a path loss that is within a predetermined range of the cell with the minimum path loss), there are additional timeslots that may be evaluated for assignment of system resources to WTRUs. The predetermined margin may be any margin as desired. In a presently preferred embodiment, however, a predetermined margin of about 5 dB is preferred.

For example, when WTRU 210 performs its path loss measurements, assume cell 222 has a path loss of XdB and cells 220 and 218 have a path loss of X+1 dB and X+3 dB respectively. Note that, in the prior art, because cell 222 has the least amount of path loss (i.e. the closest cell), WTRU 210 would normally be assigned to a timeslot within cell 222. However, as explained in the Background, it may be advantageous to assign the WTRU to a neighboring cell (i.e. a cell where the path loss between the WTRU and cell is not necessarily the minimum path loss, but a cell where the system can take advantage of the MUD and avoid the power balancing effect). That is, to take advantage of the MUD benefits, it often makes sense to assign WTRUs to cells other than their closest cell wherein the difference in path loss between cells is within a predetermined margin. The disadvantage with having more path loss to transmit over is obviously the increase in power needed and increase in interference generated to the system. However, in cases where the path loss difference is small (e.g. <3 dB), the advantage of fully utilizing the MUD to eliminate the intra-cell interference is greater than the previously mentioned disadvantages. In the case where the path loss difference is small (e.g. <3 dB,) it is more advantageous to place the new WTRU in a timeslot with existing users rather than the corresponding timeslot in a neighboring cell which is empty or otherwise available. The main reasons are that the MUD will cancel the intra-cell interference this new WTRU will cause to the existing WTRUs, and additionally will avoid the potential hazard of power balancing if the WTRU were to be placed in the neighboring cell (i.e. inter-cell interference cannot be cancelled by the MUD, therefore it needs to be managed intelligently). Therefore, because cells 220 and 218 have a path loss that is within 3 dB of the cell 222 with the minimum path loss, all three cells 222, 220, 218 are potential candidates for becoming WTRU's 210 serving cell.

The cell which is eventually selected as WTRU's 210 serving cell is the cell wherein assignment of the WTRU 210 optimizes system resources not only with respect to the selected cell, but also to the other candidate cells. The cell that is identified as optimizing system resources is preferably evaluated based on noise rise and transmission power. Of course, the evaluation may also be performed using noise rise or transmission power.

With respect to noise rise, the criterion that is preferably measured is the increase in noise rise. That is, for an uplink connection, the additional amount of interference experienced by the base station as a result of adding the WTRU is measured. Similarly, for a downlink connection, the additional amount of interference experienced by the WTRU as a result of being added to the system is measured. The timeslot/cell combination that results in the least amount of additional interference is the preferred timeslot/cell combination for assignment of resources. Although the increase in noise rise is the preferred criterion when evaluating noise rise, it is noted that the absolute value of noise rise may also be used.

With respect to transmission power, the criterion that is preferably measured is the increase in total transmission power (i.e. not just the transmission power required for a particular connection). That is, for a downlink connection, the additional amount of transmission power that is required by the base station as a result of adding the WTRU is measured. Similarly, for an uplink connection, the additional amount of transmission power that is required by the WTRU as a result of being added to the system is measured. The timeslot/cell combination that results in the least amount of additional required transmission power is the preferred timeslot/cell combination for assignment of resources. Although the increase in required transmission power is the preferred criterion when evaluating transmission power, it is noted that the absolute value of transmission power may also be used.

A processor 230, 232, 234 may be provided in the WTRUs (see WTRU 210), the at least one base station 204, and the at least one RNC 202, respectively to estimate the increase in noise rise and/or required transmission power in each timeslot for the candidate cells and to choose the cell and timeslot combination that has the lowest increase in noise rise and/or required transmission power for the connection being evaluated. Having such a processor in each system component enables the estimate and selection of the appropriate cell/timeslot combination to be performed in any system component as desired.

It is important to note that prediction of the increase in noise rise takes into account the MUD, as known to those skilled in the art. For example, in FIG. 4, cell 222 is the cell with the minimum amount of path loss. However, it is often the case that the least amount of increase in noise rise is introduced by assigning WTRU 210 to cell 220 (i.e. to a cell other than the one with the minimum path loss). This may occur, for example, because assigning WTRU 210 to the same cell as WTRU 206 eliminates the possibility of additional inter-cell interference being generated between WTRUs 210, 206 and will not result in any additional intra-cell interference because of the MUD.

Having a larger pool of possible timeslots (i.e. available timeslots/cell multiplied by the number of candidate cells) from which to assign channels allows inter-cell interference to also be minimized between neighboring cells thereby further optimizing the use of system resources. That is, for situations where there are more than one cell to choose from (i.e. there is at least one cell that has a path loss that is within a predetermined range of the cell with the minimum path loss) it may be preferable to assign WTRUs in different cells to different timeslots. Therefore, in such situations, WTRUs 210 and 206 may be assigned to the same timeslot within cell 220 so that WTRUs in cells 218 and 222 may be assigned to different timeslots. For example, assuming that when another WTRU requests system resources, cell 218 is identified as the cell that will result in the least increase in noise rise in the uplink and/or required power in the downlink. It is preferable for the new WTRU to be assigned to a timeslot in cell 218 that is different than the timeslot being used for the same purpose (i.e. uplink or downlink) in neighboring cell 220.

It should also be noted that WTRUs may be assigned to different cells in the uplink and downlink, where this is otherwise allowed in the system in which the invention is being implemented. That is, it may be the case that a timeslot in one cell is best with respect to optimizing the downlink whereas a timeslot in a different cell is best with respect to optimizing the uplink or vice versa. In systems where having separate uplink and downlink cells is not allowed, it can be advantageous to choose the serving cell which provides the most gain to the system. This can be implemented as a typical cost/weighting function of the relative gains in the uplink and downlink. Additionally, factors such a congestion, traffic asymmetry can be taken into account as well (e.g. optimize for downlink only for highly asymmetric traffic).

Figure 5:
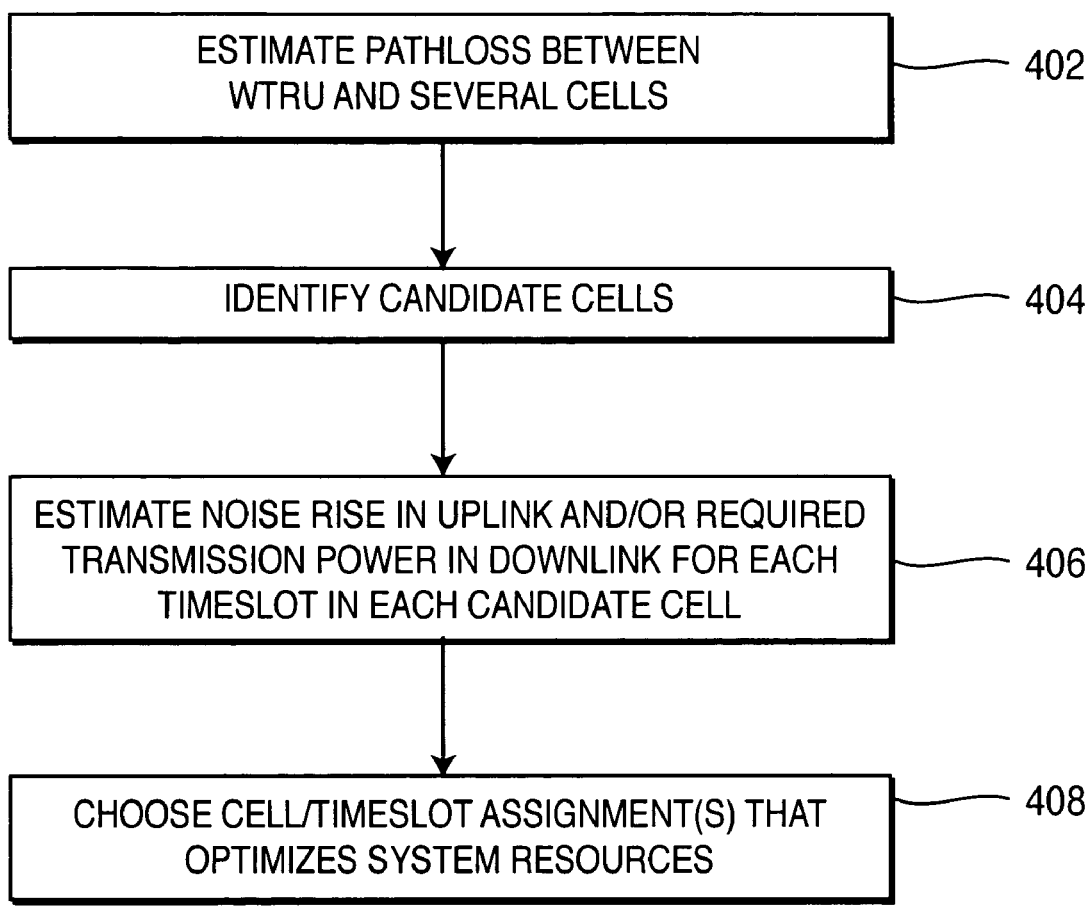
FIG. 5 is a method for evaluating candidate cells for allocation of system resources.

Referring now to FIG. 5, there is shown a method 400 for evaluating candidate cells for allocation of system resources in accordance with the present invention. The method begins in step 402 with estimating the path loss between a WTRU and several cells. The path loss measurements may be performed by either the WTRU or the base stations. Next, in step 404, candidate cells are identified. As explained above, candidate cells are cells from whom a WTRU may be assigned resources. The candidate cells are preferably those cells having a path loss with respect to the WTRU that is within a predetermined margin of the cell with the minimum path loss.

In step 406, an estimate of the increase in noise rise at the base station (in the uplink) or at the WTRU (in the downlink) and/or an estimate of the required transmission power at the base station (in the downlink) or at the WTRU (in the uplink) is calculated for each timeslot for each candidate cell. The prediction of the increase in noise rise takes into account the effect of MUD so as to provide an accurate estimate of noise rise of a cell assuming the WTRU is placed within that cell. Once the estimates are complete, the cell/timeslot assignment(s) that optimize system resources is chosen (step 408) and resources are requested therefrom. That is, the cell and timeslot combination that results in the least amount of increase in noise rise and/or the least amount of increase in transmission power in the direction (i.e. uplink or downlink) being evaluated is selected and resources are assigned using the selected cell and timeslot combination. The selection of the optimal cell and timeslot may result in the WTRU being assigned resources from the same or different cells in different directions (i.e. uplink or downlink).

Discussed below are the results of simulations performed using the teachings of the present invention. As explained above, the present invention uses joint channel/cell allocation to increase system capacity. According to the present invention, a WTRU can be allocated to either its closest cell or to any cell with a path loss within a margin (e.g. 3 dB) of that of the closest cell. In some cases increased timeslot packing outweighs the cost of increased path loss. Predicted noise rise is used to allocate each WTRU to the best cell and timeslot. Codes were not considered in the simulations. Although the present invention has been studied on a large-scale, statistical level, and found to increase system capacity, for simplicity, the results of small-scale simulations are discussed herein.

To perform the simulations, the following method was implemented and simulated:

1) Estimate the path loss between a WTRU and its serving cell, as well as between the WTRU and its neighboring cells. The estimates can be made through the use of power, Interference and SIR measurements both in the uplink and downlink. Path loss was calculated using the following Equation (Equation 1) where Tx power is transmission power and SINR is signal to interference plus noise ratio.

Pathloss (dB)=Tx power (dB)−SINR (dB)−(Interference and Noise) (dBm)   Equation 1

2) Make a list of candidate serving cells where the path loss from the WTRU to the candidate cell (PLc) is within a margin (eg. 3 dB) of the pathloss to the serving cell (Plc). The serving cell is defined as the minimum path loss between the WTRU and all the cells in the system.

3) Choose a candidate cell, and estimate the noise rise that the WTRU and base station will perceive if admitted into the system. The estimate is performed for all available timeslots in the candidate cell.

4) In the downlink, using the noise rise estimates and the path loss between the WTRU and the candidate and neighboring base stations, estimate the increase in power required by the candidate base station and neighboring base stations. Choose the candidate cell that provides the minimum mean power required by the candidate base station and neighboring base stations.

5) In the uplink, using the path loss between the WTRU and each candidate base station, and the WTRU and each neighboring base station, estimate the noise rise experienced by the candidate base station and the neighboring base station. Choose the candidate cell that provides the minimum mean interference experienced by the candidate base station and neighboring base stations. As previously explained, the noise rise estimates take into account the MUD.

Simulations in the downlink were performed with the following assumptions:
1) Inter-site distance of 523 meters;
2) Base station antenna gain of 11 dBi;
3) Log normal shadowing, where used, standard deviation of 10 dB, no correlation between cells;
4) Path loss model: PCS extension to Hata Model Urban medium-sized city (Rappaport);
5) Minimun Coupling loss: 65 dB; and
6) SIR target: 0.7 dB (simulates one code of a 12.2 kbps user).

A small number of snapshots were taken and plotted to demonstrate the benefit of the present invention. The present invention improves the number of blocked and dropped calls significantly; in certain cases dropped calls are eliminated entirely in some or all cells. Timeslot packing can be seen to increase, which explains the increased capacity. The improvement is not evenly distributed over the cells; in some cases certain cells show more improvement than others.

The actual results of a simulation with no shadowing and an offered load of 2000 WTRUs are shown below. Of course, the present invention may also be implemented with shadowing. Without shadowing most cells use only one or two timeslots; when shadowing is turned on there is a large increase in the number of timeslots used, and a large decrease in capacity. In the results shown below, timeslot packing is increased throughout the cells, and dropped and blocked calls are almost completely eliminated. The results shown below are for seven omni cells and five timeslots.

Without the present invention:
Offered load: 2000 WTRUs
Drop rate:7.4468%
Absolute Drop rate:7%
Block rate:6%
Satisfied users:92.5532%
Served users:87%
# of WTRUs switching cells:0%
With the present invention:
Offered load:2000 WTRUs
Drop rate:0%
Absolute Drop rate:0%
Block rate:0.05%
Satisfied users:100%
Served users:99.95%
# of WTRUs switching cells:4.25%

It is important to note that the present invention may be implemented in any type of wireless communication system employing MUD, as desired. By way of example, the present invention may be implemented in UMTS-TDD and TDSCDMA, or any other type of wireless communication system that is similar thereto. Further, while the present invention has been described in terms of various embodiments, other variations, which are within the scope of the invention as outlined in the claim below will be apparent to those skilled in the art.

What is claimed is:

1. A method for assigning resources in wireless communication systems, the method comprising the steps of:
measuring path loss between a wireless transmit/receive unit (WTRU) and a plurality of base stations;
identifying candidate base stations based on the path loss measurements, wherein candidate base stations include the base station with a minimum path loss with respect to the WTRU and the base stations that have path loss within a predetermined margin of the base station with the minimum path loss;
estimating an increase in noise rise in the uplink or downlink for each timeslot for each candidate base station; and
selecting the uplink or downlink timeslots having the least amount of increase in noise rise.

2. The method of claim 1 wherein the selected uplink or downlink timeslots are in a cell that does not have the minimum amount of path loss with respect to the WTRU.

3. The method of claim 1 wherein the selected uplink or downlink timeslots have the least amount of noise rise in terms of absolute value.

4. The method of claim 1 wherein the selected uplink or downlink timeslots have the least amount of increase in noise rise and required transmission power.

5. The method of claim 4 wherein the selected uplink or downlink timeslots have the least amount of noise rise and required transmission power in terms of absolute values thereof.

6. The method of claim 1 wherein the predetermined margin is 3 dB.

7. A wireless transmitlreceive unit (WTRU) wherein a plurality of cells may be evaluated for assigning system resources, the WTRU comprising:
a first processor configured to measure path loss between itself and a plurality of cells, and
to identify candidate cells, based on path loss, wherein the candidate cells include a cell with the minimum path loss and the cells that have a path loss within a predetermined margin of the cell with the minimum path loss;
a second processor configured to estimate an increase in noise rise or required transmission power in each timeslot for the candidate cells and request resources in a timeslot of a candidate cell having the least amount of increase in noise rise or the least amount of increase in required transmission power.

8. The WTRU of claim 7 wherein the timeslot and cell combination from which resources are requested is the timeslot and cell combination having the least amount of increase in noise rise and the least amount of increase in required transmission power.

9. The WTRU of claim 8 wherein the cell of the selected timeslot and cell combination is not the cell with the minimum amount of path loss with respect to the WTRU requesting system resources.

10. The WTRU of claim 7 wherein the predetermined margin is 3 dB.

11. A method for assigning resources in wireless communication systems, the method comprising the steps of:
measuring path loss between a wireless transmit/receive unit (WTRU) and a plurality of base stations;

identifying candidate base stations based on the path loss measurements, wherein candidate base stations include the base station with a minimum path loss with respect to the WTRU and the base stations that have path loss within a predetermined margin of the base station with the minimum path loss;

estimating an increase in required transmission power in the uplink or downlink for each timeslot for each candidate base station; and selecting the uplink or downlink timeslots having the least amount of increase in transmission power.

12. The method of claim 11 wherein the selected uplink or downlink timeslots are in a cell that does not have the minimum amount of path loss with respect to the WTRU.

13. The method of claim 11 wherein the selected uplink or downlink timeslots have the least amount of required transmission power in terms of absolute value.

14. The method of claim 11 wherein the predetermined margin is 3 dB.

* * * * *